United States Patent [19]

Morellini

[11] Patent Number: 4,746,033

[45] Date of Patent: May 24, 1988

[54] DISPENSING APPARATUS

[76] Inventor: Peter Morellini, Post Office Box 188, Ingham, Queensland 4850, Australia

[21] Appl. No.: 897,370

[22] PCT Filed: Nov. 12, 1985

[86] PCT No.: PCT/AU85/00281

§ 371 Date: Aug. 25, 1986

§ 102(e) Date: Aug. 25, 1986

[87] PCT Pub. No.: WO86/02806

PCT Pub. Date: May 22, 1986

[30] Foreign Application Priority Data

Nov. 12, 1984 [AU] Australia .............................. PG8084
Nov. 29, 1984 [AU] Australia .............................. PG8339
Sep. 19, 1985 [AU] Australia .............................. PH2495

[51] Int. Cl.⁴ .......................................... A01M 25/00
[52] U.S. Cl. .................................... 222/129; 222/185; 43/131
[58] Field of Search ................. 43/131, 124; 119/51.5; 222/129, 173, 185

[56] References Cited

U.S. PATENT DOCUMENTS

| 716,533 | 12/1902 | Harker | 43/131 |
|---|---|---|---|
| 1,443,287 | 1/1923 | Snyder et al. | |
| 1,994,859 | 3/1935 | Langum | 43/131 |
| 2,664,663 | 1/1954 | Mullen . | |
| 2,690,028 | 9/1954 | Mullen . | |
| 2,715,386 | 8/1955 | Jones | 119/51.5 |
| 2,725,663 | 12/1955 | Mullen . | |
| 2,725,664 | 12/1955 | Mullen . | |
| 2,725,666 | 12/1955 | Mullen . | |
| 2,944,364 | 7/1960 | Kelly | 43/131 |
| 2,971,681 | 2/1961 | Galbierz | 222/548 |
| 3,196,835 | 7/1965 | Bergevin | 119/51.5 X |
| 4,192,256 | 3/1980 | Clugston | 119/51.5 |

FOREIGN PATENT DOCUMENTS

| 225102 | 4/1958 | Australia . | |
|---|---|---|---|
| 1939409 | 3/1941 | Fed. Rep. of Germany . | |
| 1144028 | 10/1957 | France . | |
| 2031712 | 11/1970 | France . | |
| 2435199 | 4/1980 | France . | |
| 219068 | 7/1942 | Switzerland . | |
| 290804 | 8/1953 | Switzerland . | |
| 342782 | 1/1960 | Switzerland . | |
| 434861 | 10/1967 | Switzerland . | |
| 430946 | 2/1935 | United Kingdom | 43/131 |

Primary Examiner—Joseph J. Rolla
Assistant Examiner—Nils E. Pedersen
Attorney, Agent, or Firm—Wood, Dalton, Phillips, Mason & Rowe

[57] ABSTRACT

Apparatus (10) for dispensing toxic granular, pelletized, or particulate material to vermin such as rodents including a hollow pipe member (11) defining a reservoir for the material to be dispensed and arranged to be supported in a hole (15) in the ground and extend upwardly therefrom, an open topped container (12) supported coaxially on the pipe (11), and an aperture (16) in the wall of the pipe adjacent to the container (12) so that toxic material may pass therethrough into the container and a cover (13) supported coaxially on the pipe (11) and extending over the container (12) to shield the container (12) from adverse weather conditions such as rain.

10 Claims, 1 Drawing Sheet

DISPENSING APPARATUS

This invention relates to dispensing apparatus and particularly to apparatus for dispensing particulate, granular or pelletised material, for example granular substances toxic to vermin such as rats.

BACKGROUND ART

Rats, mice and other vermin can cause considerable damage in standing crops and therefore it is desirable to have an efficient means for exterminating such vermin. Whilst toxic substances in granular or pelletised form are well known, care must be taken in the manner in which such substances are used. For example, whilst the toxic substances can be simply scattered on the ground they can present a hazard to children, domestic animals and birds and furthermore such substances if used in the above manner are then exposed to weather conditions and may be rendered ineffectual by rain. Whilst dispensers have been proposed for the purpose of dispensing granular toxic and other substances, most known dispensers are not suitable for use in agricultural applications say in a field where crops are grown as they are not easily locatable and therefore are liable to be damaged by agricultural implements or cause damage to such implements. Furthermore, such known dispensers have not proved to be particularly efficient or safe in use.

The present invention aims to overcome or at least alleviate some of the above disadvantages by providing improved dispensing apparatus particularly suited to the dispensing of granular particulate or pelletised material. The present invention is particularly applicable to the dispensing of toxic substances for the extermination of rats or other vermin and may be used in any location where a safe and reliable operation is desired such as in a field amongst crops. The dispenser of the present invention also is preferably constructed in such a manner as to be easily visible in use and to include a relatively large reserovir for granular materials to thereby reduce the frequency of refilling.

DISCLOSURE OF INVENTION

With the above and other objects in view, this invention resides broadly in apparatus for dispensing granular, pelletised or particulate material or the like, said apparatus including an elongated hollow member defining a reserovir for material to be dispensed, container means supported on said hollow member and communicating with the interior thereof whereby material within said hollow member may pass into said container, cover means supported on said hollow member and at least partially shieldng said container and means associated with said apparatus and extending on the operative lower side of said container means for engagement with the ground so as to support said apparatus in upstanding attitude.

Preferably the elongated hollow member comprises a pipe and said container means and cover means are supported co-axially on said pipe. Preferably also said container means includes an open trough portion extending around its periphery to catch any spill-over of material from said container. Preferably also, said container communicates with the interior of said hollow member through apertures in the wall thereof, said apertures being partly or fully closeable to restrict communication between said container means and the interior of said hollow member. Suitably said container means is of dish like form and said cover means is of inverted dish like form. Preferably also a water receptacle is associated with the apparatus to attract vermin to the apparatus. Suitably said water receptacle may be formed integrally with the cover means and defined by a peripheral lip thereon. Preferably water reservoir means, suitably in the form of pipe members, are secured to said hollow member to supply water to the receptacle.

BRIEF DESCRIPTION OF DRAWINGS

In order that the invention may be readily understood and put into practical effect, reference will now be made to the accompanying drawings which illustrate a preferred embodiment of the invention and wherein.

BEST MODE FOR CARRYING OUT THE INVENTION

Figure 1:
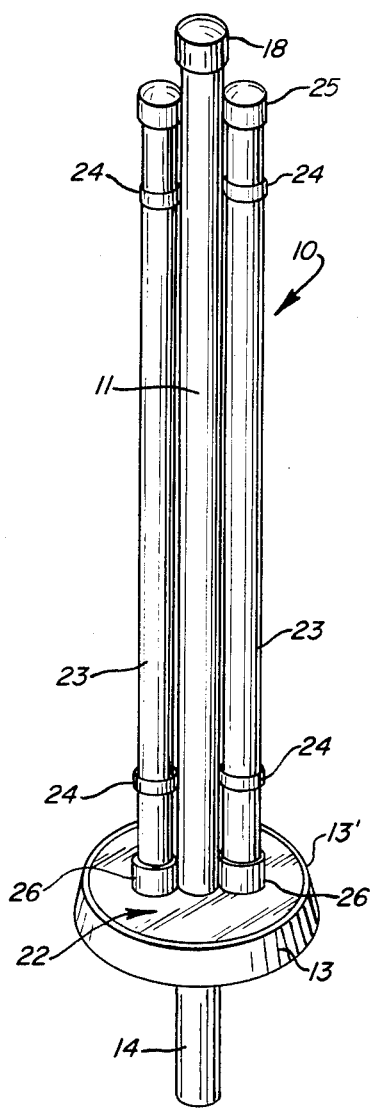
FIG. 1 is a perspective view of the apparatus according to the present invention.
Figure 3:
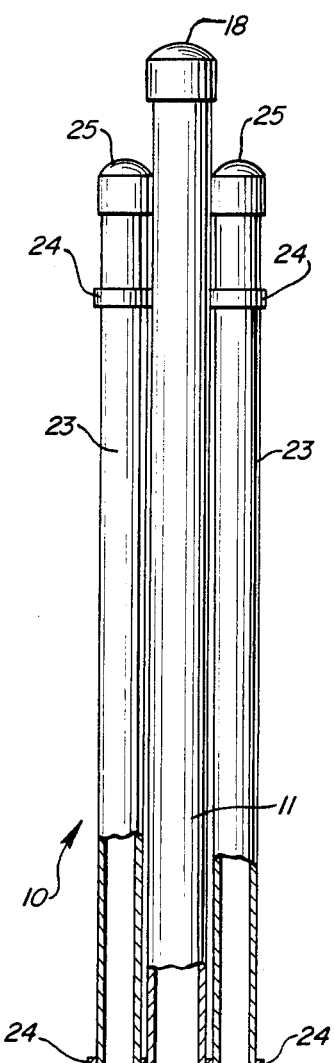
FIG. 3 is a partly cut away sectional view of the apparatus illustrated in FIGS. 1 and 2.
Figure 2:
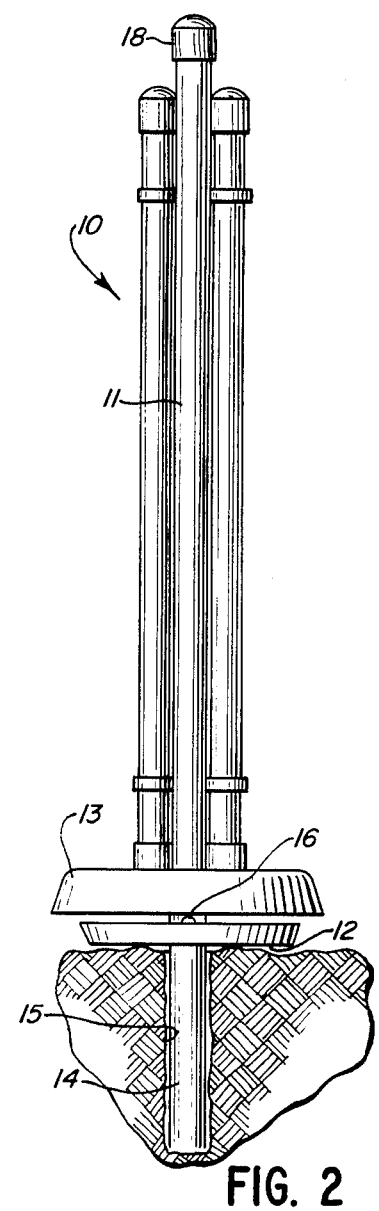
FIG. 2 is an elevational view of the dispensing apparatus supported in an operative attitude.

Referring to the drawings, the dispensing apparatus 10 of the present invention is a first preferred form includes an elongated hollow member 11, in this instance formed of PVC pipe having supported coaxially intermediate its ends, an open topped container or tray 12 for dispensed material and a weather cover 13 which is supported coaxially above the tray 12 and adjacent thereto so that the container 12 is shielded from external weather conditions such as rain. As shown in FIG. 2, both the container 12 and cover 13 are spaced from the operative lower end 14 of the member 11 so that the lower end 14 may be located in a hole 15 in the ground so that the apparatus may be supported stably in an upstanding attitude with the container 12 adjacent to the ground surface. A plurality of apertures 16 are formed in the wall of the hollow member 11 adjacent the container 12 and the member 11 is closed off adjacent to the apertures 16 as by a plug 17 so that the area above the plug 17 defines a reservoir for material to be dispensed into the container 16. A removable cap 18 is provided at the upper end of the member 11 so that the interior of the member 11 may be filled with the material to be dispensed, this material being directed through the apertures 16 into the open container 12 so as to be accessible to vermin such as rats. Preferably the container 12 is provided with a further rim portion 19 which may be defined by the rim of a further larger diameter container secured co-axially to the container 12 to define an annular trough 20 to catch any spill over of material from the container 12 so that possible poisoning of domestic or farmyard animals is reduced or eliminated. Alternatively the outer edge of the container 12 may be provided with an integrally formed peripheral gutter portion for this purpose.

Figure 4:
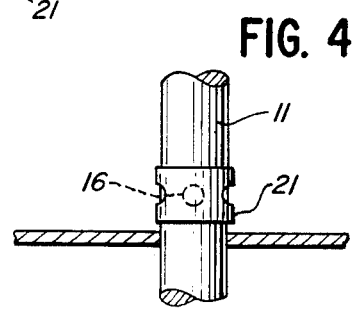
FIG. 4 illustrates details of one form of feed closure mechanism for the dispensing apparatus.

As shown, the cover 13 which is of inverted basin like form, is located adjacent to the container 12 and extends thereover so as to shield the container 12 say from rainwater which may otherwise cause deterioration of the material therein. The cover 13 may be either fixed in position or be slidable along the member 11 so that in the latter situation when the apparatus 10 is desired to be transported from one location to another, the cover 13 can be slid down over the container 12 to prevent escape of mateiral therefrom. Alternatively, when the cover 13 is in a fixed attitude, an apertured sleeve 21 (see FIG. 4) may be provided co-axially about the member 11 to surround the apertures 16 therein. The sleeve 21 is in close sliding engagement with the member 11 so that the feed apertures 16 may be closed, fully open or only partly open by simple rotation of the apertured sleeve 21 to a desired position, say where the apertures therein are misaligned, aligned or only partly aligned with the apertures 16. Thus where it is required to remove or transport the apparatus 10 in this instance, the apertures 16 may be simply closed off by rotation of the sleeve 21 to prevent spillage. Of course, many other suitable closure arrangements will be apparent to persons skilled in the art.

So that vermin are attracted to the area of the dispensing apparatus 10 either before or after eating the toxic substances dispensed therefrom, a water receptacle is mounted on the apparatus so that where the toxic substances cause say rats to have an increased thirst, they will remain in the area of the dispensing apparatus 10 rather than being attracted to a water supply for example within a house. Such a water receptacle may be a separate receptacle of similar form to the feed container 12 and mounted coaxially on the support member 11 above the cover 13. Alternatively the water receptacle may be formed integally with the cover 13. For this purpose, the cover 13 is preferably provided with a raised rim 13' about its periphery so as to define a water receiving space 22.

Water is preferably supplied to the space 22 by means of a pair of reservoirs which in this instance comprise further elongated pipe members 23 secured releasably to opposite sides of the hollow support member 1 by respective clips 24. Each pipe member 23 may be permanently closed at its upper end by a cap 25 and provided with a removable cap 26 at its lower end preferably screw engaged with the pipe member 23. Each cap 26 is provided with an aperture 27 therein so that the level of water in the receptacle may be varied by altering the relative vertical positioning of the aperture 27 by either screwing in or screwing out the cap 26. In this embodiment, two water reservoirs are provided for stability purposes, however, only one reserovir is necessary. When it is desired to fill the pipe members 23 with water, they are simply unclipped from the support member 12, the caps 27 at the lower end thereof removed and the pipe members 23 filled with water after which the caps 26 are re-engaged and screwed fully in to close off the apertures 27. The pipe members 23 may then be clipped onto the support member 11 and the caps 26 unscrewed to the required extent to fill the space 22 with water. In use, the desired position for location of the dispensing apparatus is selected and a vertical hole dug in the ground, for example with a hand auger, with the hole being preferably of such a diameter as to closely receive the lower end 14 of the apparatus and being of such a depth that the container 12 will sit flat on the ground surrounding the hole. The hollow support member 11 may be filled with the material to be dispensed by simply removing the end cap 18 whilst the water reservoirs 23 are filled in the above described manner.

The apparatus is set up such that there is just enough clearance under the downwardly directed side wall of the cover to permit rats and mice to have access to the material in the container 12. The lower rim of the cover may be spaced relatively closely to the ground so that rats and mice can dig underneath the cover and the spacing between the container 12 and cover 13 is such as to prevent small animals such as pets and birds from gaining access to the container and bait therein but is sufficient to allow access by rats and mice.

When the apparatus is set up as above, the sleeve or collar 21 is rotated so as to open the apertures 16 and permit the material to pass into the container 12. The caps 26 may also be unscrewed to the desired extent so that water will pass into the receptacle 22. Where it is necessary to change location of the apparatus, the water tubes 23 are preferably unclipped from the member 11 and the sleeve or collar 21 rotated to close off the apertures. The apparatus may then be removed from the ground and the water tipped out of the receptacle 22 and the toxic material in the container tapped into a bucket or the like. The apparatus can then be resisted in the above manner. Preferably the components of the apparatus are formed of plastics material, for example the support pipe 11 and water reservoirs 23 may be formed of conventional PVC pipe with the cover 13 and container 12 formed of vacuum formed sheet plastics material. Plastics material will ensure against damage being caused in the event of an agricultural implement passing over the apparatus whilst the upstanding nature of the apparatus will enable it to be easily located in higher grass or crop areas if left in the field by mistake.

Of course the water reservoirs 23 may be secured to the hollow support member 11 in any suitable fashion and may if desired be fixed to the support member 11.

While the above has been given by way of illustrative example only, many modifications and variations as would be apparent to persons skilled in the art may be made thereto without departing from the broad scope and ambit of the invention as herein set forth and defined in the following claims.

I claim:

1. Apparatus for dispensing granular, pelletized, or particulate material or the like, said apparatus including a first elongated hollow member defining a reservoir for material to be dispensed, container means supported on said hollow member and communicating with the interior thereof whereby material within said hollow member may pass into said container means, cover means supported on said hollow member and at least partially shielding said container means, water receptacle means supported on said hollow member, at least one further elongated member releasably mounted to said first hollow member and defining a reservoir for water, outlet aperture means for said water at the operative lower end of said further elongated member whereby water may be supplied therethrough to said water receptacle means, and means associated with said apparatus and extending on the operative lower side of said container means for engagement with the ground so as to support said apparatus in an upstanding attitude.

2. Apparatus according to claim 1, wherein said container means and cover means are supported coaxially on said elongated hollow member and wherein said container is adapted to communicate with the interior of said hollow member through at least one aperture in the wall thereof.

3. Apparatus according to claim 2, and including means associated with said hollow member adjacent said aperture for selectively varying the extent of opening of said aperture.

4. Apparatus according to claim 1, wherein said container means comprises a first open topped container and wherein said cover means is in the form of an inverted open topped container of greater diameter than the diameter of said first container.

5. Apparatus according to claim 4 wherein said first container includes trough means extending around the periphery thereof and adapted to catch spillover of material from first container.

6. Apparatus according to claim 1, wherein said outlet means are formed in a cap releasably engaged with the said lower end of said further member.

7. Apparatus according to claim 1, wherein said cover means includes an upstanding peripheral rim portion on the operative upper side thereof said rim portion defining said water receptacle.

8. Apparatus according to claim 1 wherein said container means and cover means are spaced upwardly from the operative lower end of said hollow member, said lower end comprising said engagement means and being locatable in a hole in the ground to support said apparatus in an upstanding attitude.

9. Apparatus for dispensing granular, pelletized, or particulate material or the like, said apparatus including an elongated tubular member defining a reservoir for material to be dispensed, open-topped container means supported coaxially on said tubular member adjacent one end thereof and communicating with the interior of said tubular member through an aperture in the wall thereof whereby material within said tubular member may pass into said container means, cover means of inverted open-topped container form supported coaxially on said tubular member, said cover means including a peripheral side wall extending downwardly to a position outwardly of but adjacent to said container means so that said cover means substantially shields said container means from external weather conditions, said peripheral side wall of said cover means defining with said container means a continuous peripheral access space to material with said container means, said cover means further including an upwardly extending peripheral rim portion defining on the upper side of said cover means a receptacle for water, and there being provided reservoir means for water mounted to said tubular member, and outlet means on said reservoir means for supplying said water to said receptacle.

10. Apparatus according to claim 9 wherein said tubular member extends below said container means to define support means for said apparatus for location in a hole in the ground so as to support said apparatus in an upstanding attitude.

* * * * *